United States Patent
Lewington et al.

(10) Patent No.: US 9,234,484 B2
(45) Date of Patent: Jan. 12, 2016

(54) SNORKEL INTAKE DIRT INERTIAL SEPARATOR FOR INTERNAL COMBUSTION ENGINE

(71) Applicant: Ford Global Technologies, LLC, Dearborn, MI (US)

(72) Inventors: Neil Paul Lewington, Victoria (AU); Rodrigo Mendes Oliveira, Victoria (AU)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 14/190,494

(22) Filed: Feb. 26, 2014

(65) Prior Publication Data

US 2015/0240760 A1 Aug. 27, 2015

(51) Int. Cl.
   *B01D 45/12* (2006.01)
   *F02M 35/022* (2006.01)
   *B60K 13/02* (2006.01)

(52) U.S. Cl.
   CPC ............ *F02M 35/0226* (2013.01); *B60K 13/02* (2013.01)

(58) Field of Classification Search
   CPC ................ B01D 45/12; F02M 35/022; F02M 35/10013; F02M 35/02; F02M 35/024; Y02T 10/146
   USPC ......... 55/457, 396, 399, 414, 424, 456, 385.3
   See application file for complete search history.

(56) References Cited

U.S. PATENT DOCUMENTS

| | | | | |
|---|---|---|---|---|
| 3,258,895 A | * | 7/1966 | Wiebe et al. | 95/269 |
| 3,362,155 A | * | 1/1968 | Driscoll | 60/39.092 |
| 3,517,821 A | * | 6/1970 | Keller et al. | 210/512.1 |
| 3,713,280 A | * | 1/1973 | Keller et al. | 55/360 |
| 4,159,899 A | * | 7/1979 | Deschenes | 55/454 |
| 4,629,481 A | * | 12/1986 | Echols | 55/348 |
| 6,878,189 B2 | * | 4/2005 | Moredock | 95/270 |
| 6,921,424 B2 | * | 7/2005 | Bugli et al. | 55/385.3 |
| 7,452,409 B2 | | 11/2008 | Moredock et al. | |
| 7,637,978 B2 | * | 12/2009 | Jung | 55/457 |
| 8,262,761 B2 | | 9/2012 | Babb et al. | |
| 8,617,279 B2 | * | 12/2013 | Schlesinger et al. | 55/385.1 |
| 2007/0234903 A1 | | 10/2007 | Xu et al. | |

FOREIGN PATENT DOCUMENTS

| | | |
|---|---|---|
| CN | 201739041 | 2/2011 |
| DE | 102011107730 | 1/2013 |
| JP | 2006037947 | 2/2006 |

* cited by examiner

*Primary Examiner* — Duane Smith
*Assistant Examiner* — Minh-Chau Pham
(74) *Attorney, Agent, or Firm* — LeClairRyan

(57) ABSTRACT

An integrated snorkel intake inertial separator is provided to remove dust and dirt contaminants from the engine intake system prior to reaching the air cleaner. The snorkel initiates a cyclonic motion at the snorkel inlet that propagates downstream in a downpipe towards the air cleaner. The cyclonic motion is initiated by radial stators mounted in one embodiment in the snorkel inlet cap or, alternatively, further down the throat of the downpipe. The contaminants in the intake flow are transported radially outwards by the cyclonic motion and are then expelled via a series of extraction ducts formed in the snorkel downpipe. The extraction vents are perpendicular to the cyclonic flow allowing dirt, dust and water particles to be extracted by means of cyclonic motion and gravity. The exit slots are located in regions of low pressure generated by the external aerodynamic airflow around the snorkel.

16 Claims, 6 Drawing Sheets

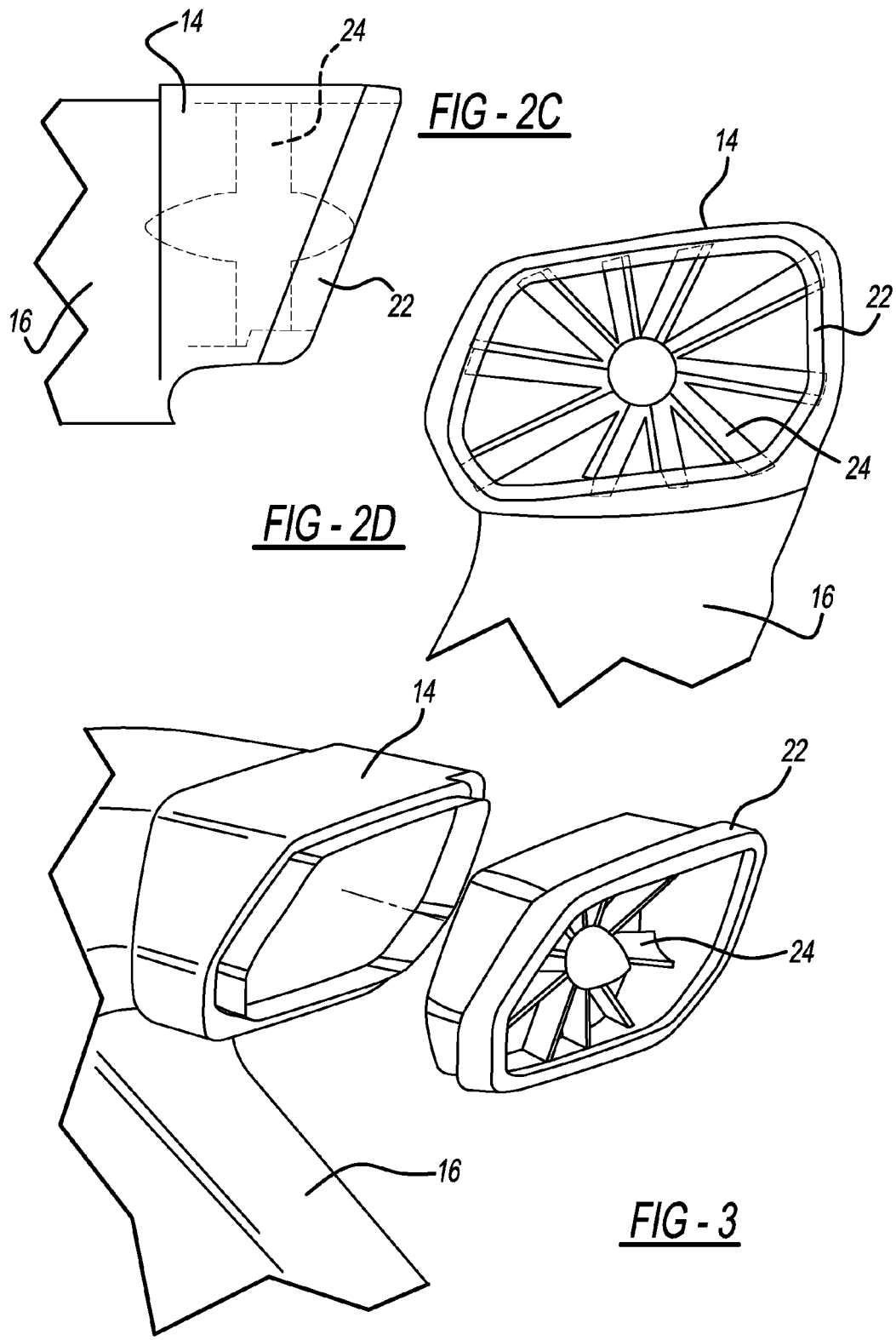

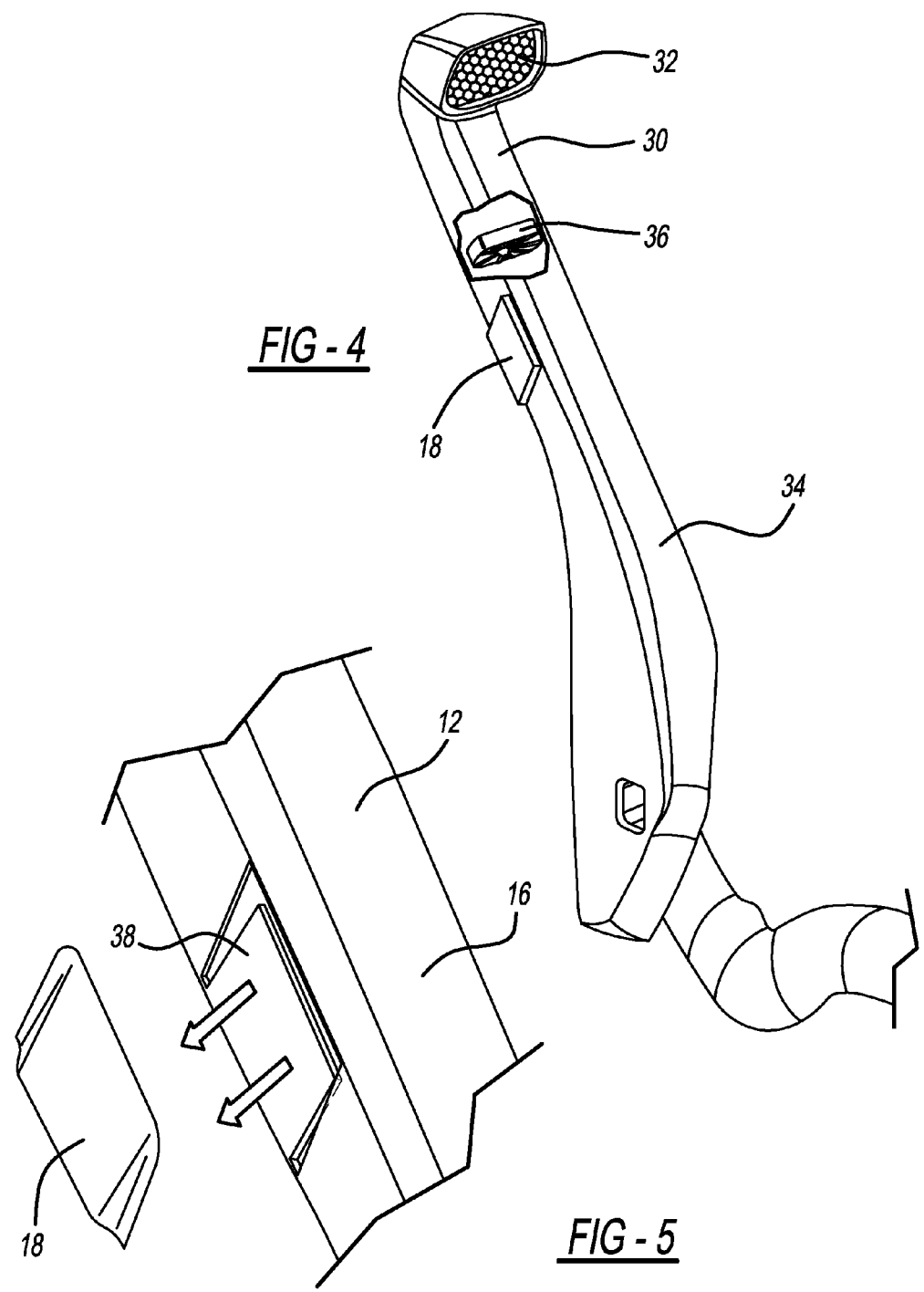

SNORKEL INTAKE DIRT INERTIAL SEPARATOR FOR INTERNAL COMBUSTION ENGINE

TECHNICAL FIELD

The disclosed inventive concept relates generally to air filtration systems for internal combustion engines for vehicles. More particularly, the disclosed inventive concept relates to snorkel intake systems for such engines that remove dust and dirt contaminants from the engine intake system prior to reaching the air cleaner.

BACKGROUND OF THE INVENTION

Motor vehicles are required to operate in a number of environments that contain many undesirable contaminants, such as dust, dirt, and water that are problematic for internal combustion engines. In extreme environments, these contaminants are ingested into the air cleaner and can result in the air cleaner reaching capacity by the saturation of contaminants well before the scheduled service interval. For example, vehicles operating in the mining sector experience engine problems despite their service intervals being reduced for vehicles.

Known snorkel systems with pre-cleaning technology are typically of the aftermarket type which provide for the collection of debris in collection chambers. These chambers need to be emptied between service intervals and thus do not provide a practical solution to the problem created by incoming, contaminant-laden air. Furthermore, as aftermarket systems, these snorkel designs prohibit integration into the snorkel system without significant modification to the snorkel design and vehicle aesthetics. As the components are aftermarket, they are not required to conform to the standards of the original equipment manufacturer with respect to such issues as vision constraints, safety and durability requirements.

As in so many areas of vehicle technology there is always room for improvement related to the use and operation of snorkel systems for vehicles that are intended to remove contaminants from the incoming air before reaching the air cleaner of the vehicle's engine.

SUMMARY OF THE INVENTION

The disclosed invention overcomes the problems of known contaminant separators by providing an integrated snorkel intake inertial separator that removes dust and dirt contaminants from the engine intake system prior to reaching the air cleaner in a practical, efficient and cost-effective manner.

The snorkel according to the disclosed inventive concept initiates a cyclonic motion at the snorkel inlet that propagates downstream in a downpipe towards the air cleaner. The cyclonic motion is initiated by radial stators mounted in one embodiment in the snorkel inlet cap. As an alternate embodiment, the radial stators are provided further down the throat of the downpipe.

The contaminants in the intake flow are transported radially outwards by the cyclonic motion and are then expelled via a series of extraction ducts formed in the snorkel downpipe. The extraction vents are configured so that they are perpendicular to the cyclonic flow allowing dirt, dust and water particles to be extracted by means of cyclonic motion and gravity. To further promote extraction of the contaminants, the exit slots are located in regions of low pressure generated by the external aerodynamic airflow around the snorkel.

Analytical investigations using computational fluid dynamics (CFD) demonstrate that the inlet stators generate a strong coherent cyclonic motion in the snorkel downpipe. This rotational flow is sufficient to expel a large proportion of the contaminants in the intake flow prior to reaching the air cleaner. Optimization of the inlet stator concept significantly extends the service interval for the flow cleaner and provides the customer with a dealer fit option for extreme contaminant environments. The integrated inertial separator of the disclosed inventive concept ensures the snorkel design meets the stringent design, safety and durability constraints set forth by the industry while maintaining the aesthetics of the snorkel design The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 2C illustrates a partial side view of the inlet of the snorkel intake dirt inertial separator of the disclosed inventive concept shown in partial shadow view;

FIG. 2D illustrates a partial front view of the inlet of the snorkel intake dirt inertial separator shown in FIG. 2C;

FIG. 3 illustrates a partial perspective and exploded view of the inlet of the snorkel intake dirt inertial separator of the disclosed inventive concept;

FIG. 4 illustrates a perspective view of an alternate embodiment of the snorkel intake dirt inertial separator according to the disclosed inventive concept shown in partial broken view;

FIG. 5 illustrates a partial perspective view of the snorkel intake dirt inertial separator showing a close-up of the extractor plate spaced apart from the snorkel intake dirt inertial separator;

DETAILED DESCRIPTION OF THE PREFERRED EMBODIMENT

Figure 1:
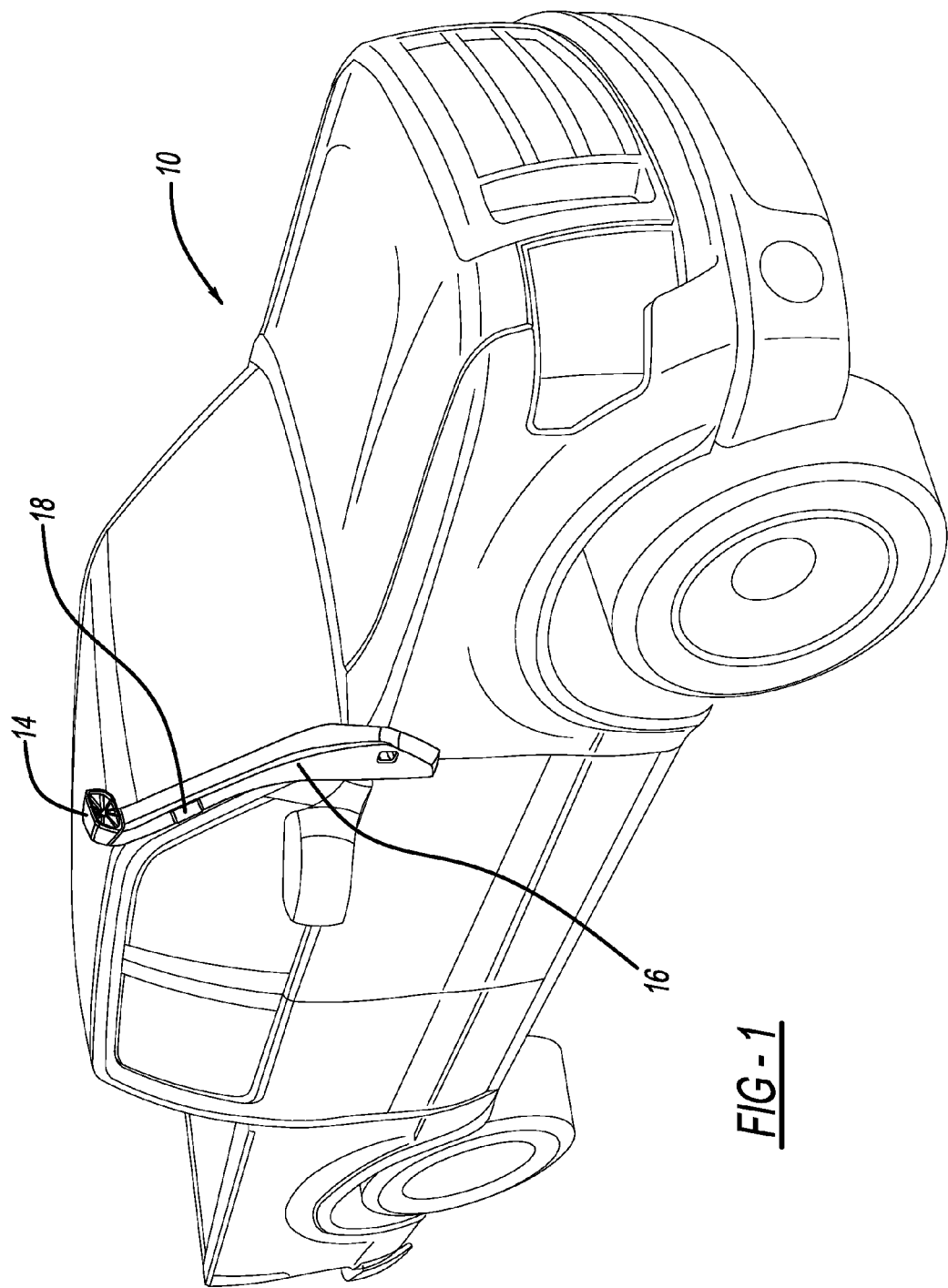
FIG. 1 illustrates a perspective view of a vehicle having a snorkel intake dirt inertial separator according to the disclosed inventive concept.
Figure 2A:
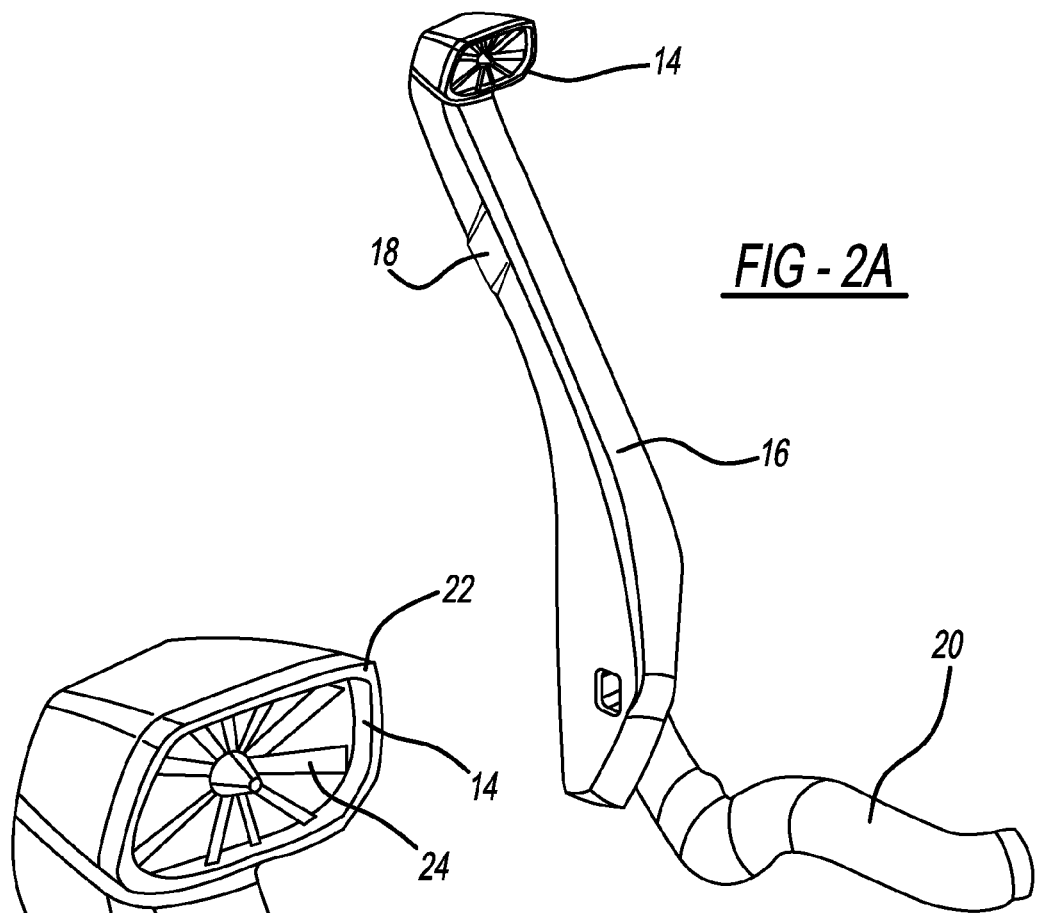
FIG. 2A illustrates a perspective view of the snorkel intake dirt inertial separator.
Figure 2B:
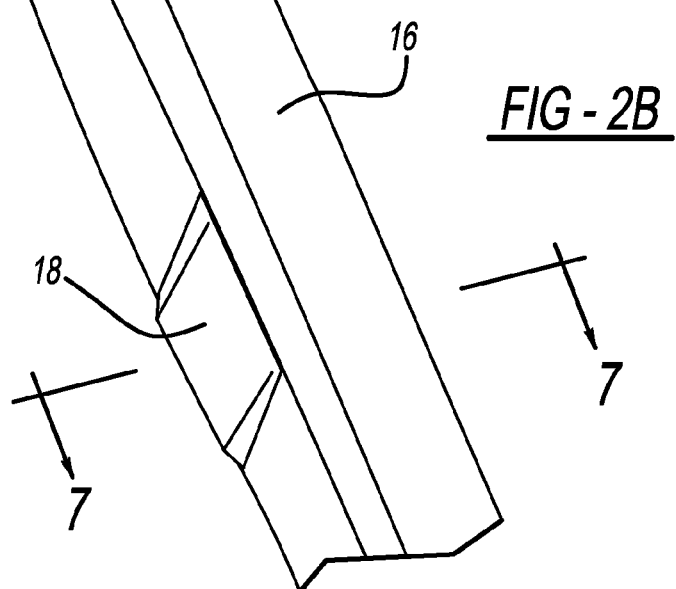
FIG. 2B illustrates a portion of the snorkel intake dirt inertial separator of the disclosed inventive concept shown in perspective view.

In the following figures, the same reference numerals will be used to refer to the same components. In the following description, various operating parameters and components are described for different constructed embodiments. These specific parameters and components are included as examples and are not meant to be limiting.

In general, the disclosed inventive concept provides an integrated snorkel intake inertial separator to remove dust and dirt contaminants from the engine intake system prior to reaching the air cleaner. The snorkel intake inertial separator can find broad application in a variety of vehicles including, as a non-limiting example, the vehicle shown in FIG. 1, generally illustrated as 10. The vehicle 10 is of the sports-utility vehicle type but the snorkel intake inertial separator of the disclosed inventive concept, shown in FIG. 1 as element 12, may also be used on trucks and specialty vehicles, such as mining or military vehicles, and particularly has use in situations where dirt and dust are common in the environment of vehicle operations.

The snorkel intake inertial separator 12 includes an inlet 14 and a downpipe 16. It is to be understood that the illustrated shape of the snorkel intake inertial separator 12 is suggestive only as other shapes maybe suitable to accomplish the purpose of the disclosed inventive concept.

Various detailed views of the snorkel intake inertial separator 12 are shown in FIGS. 2A-2D. The snorkel intake inertial separator 12 includes at least one extraction vent plate 18 fitted to the side of the downpipe 16. More than one extraction vent plate 18 may be fitted to the downpipe 16 on the same or other sides of the downpipe 16. An air conduit 20 fluidly attaches the output or lower end of the snorkel intake inertial separator 12 to the air intake of the engine.

The snorkel intake inertial separator 12 relies on a series of radial vanes forming a stator to induce cyclonic motion within the downpipe 16. Particularly, an end cap 22 is fitted to the intake end of the downpipe 16. The end cap 22 includes a radial arrangement of stator vanes 24 integrally fitted to the inlet 14 of the downpipe 16 to induce cyclonic motion within the downpipe 16.

The end cap 22 may be provided as part of the snorkel intake inertial separator 12 or may be fitted to an existing snorkel intake as an aftermarket item to replace known grille designs. Attachment of the end cap 22 to the inlet 14 of the downpipe 16 is illustrated in FIG. 3.

The snorkel intake inertial separator 12 illustrates the stator vanes 24 of the end cap 22 as being positioned in the inlet 14 of the downpipe 16. While this arrangement is preferred, it is not the only arrangement possible, as the stator vanes could be positioned elsewhere relative to the downpipe 16. As a non-limiting example, and referring to FIG. 4, a snorkel intake dirt inertial separator 30 is illustrated that has an inlet 32 and an associated downpipe 34. According to this arrangement, downpipe stator vanes 36 are positioned at a distance downstream of the inlet 32.

Figure 6:
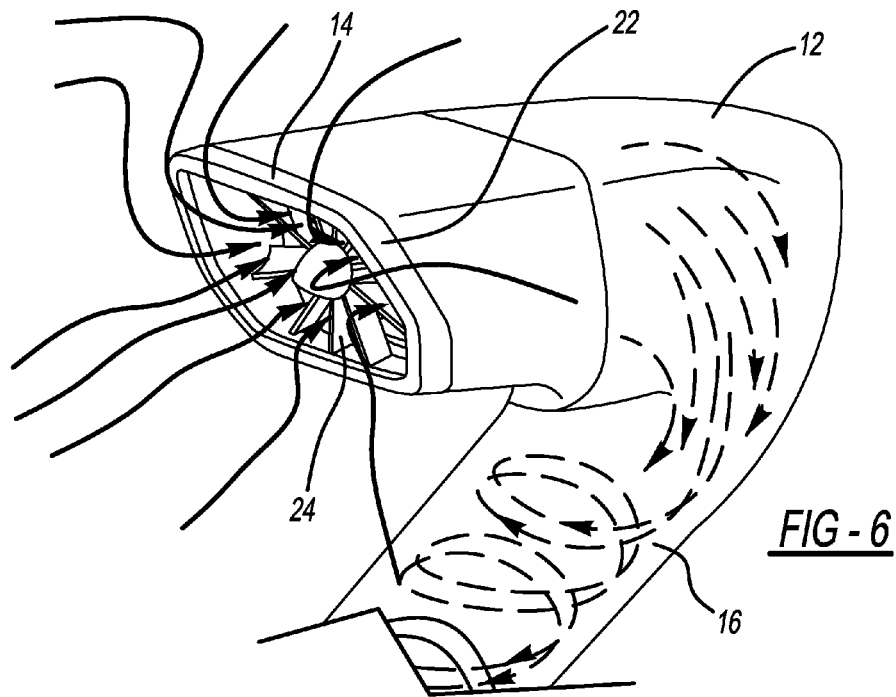
FIG. 6 illustrates a partial perspective view of the intake of the intake portion of the snorkel intake dirt inertial separator of the disclose inventive concept showing the incoming air and the cyclonic action resulting from the radial stators.
Figure 7:
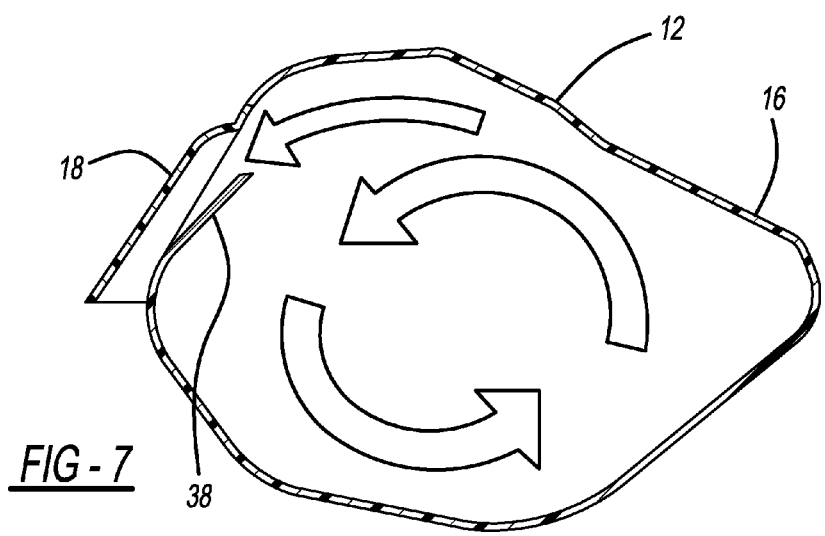
FIG. 7 illustrates a sectional view of the downpipe of the snorkel intake dirt inertial separator taken along line 7-7 of FIG. 2B.

Regardless of the whether the stator vanes are placed at the inlet of the downpipe or downstream of the inlet, the radial arrangement of the stators induces cyclonic motion within the snorkel, as noted above. A graphic illustration of the cyclonic flow is shown in FIG. 6 in which the stator vanes 24 of the end cap 22 have induced a cyclonic air flow within the downpipe 16. In this figure the velocity streamlines indicate cyclonic flow in the snorkel downpipe 16 that are induced by stator vanes 24 (or stator vanes 36, depending on the embodiment).

Figure 8:
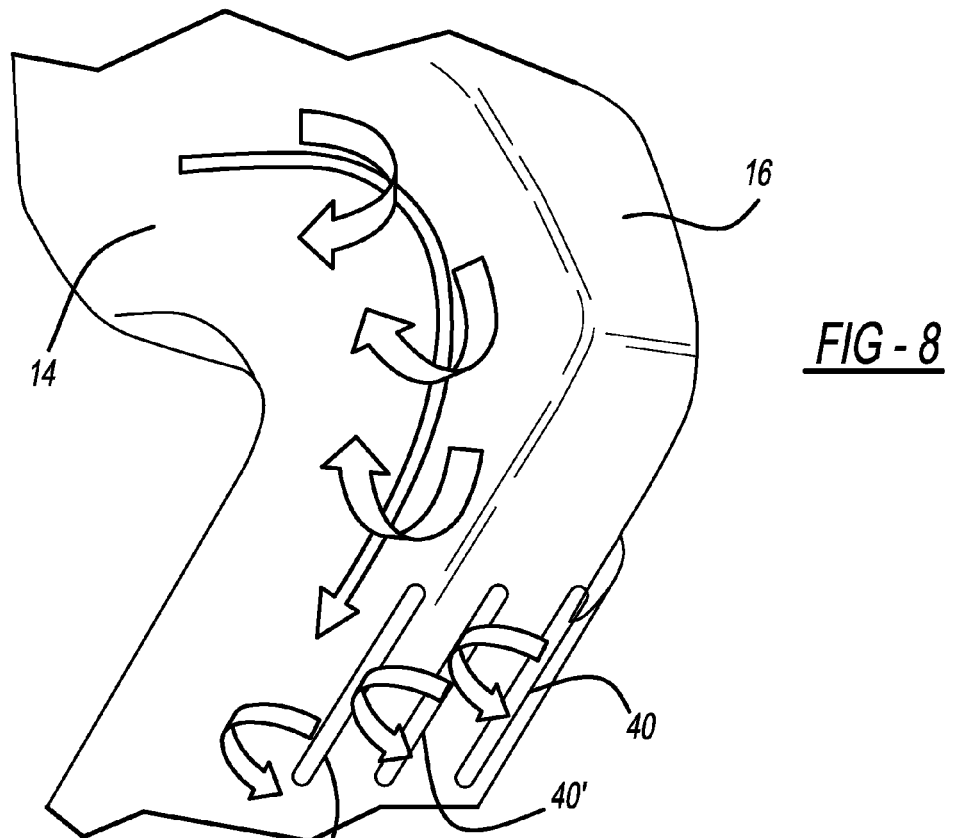
FIG. 8 illustrates a partial internal view of a portion of the downpipe of the snorkel intake dirt inertial separator illustrating the air turbulence pattern formed therein during operation.

It is the cyclonic action illustrated in FIG. 6 that causes the contaminants often found within the air flow to be forced radially outwards by cyclonic flow as illustrated in FIG. 8 which is a partial internal view of a portion of the downpipe 16 of the snorkel intake dirt inertial separator 12 illustrating the air turbulence pattern formed therein during operation. The particulates are "caught" or "scraped" by a scraper 38 that directs the contaminants out of the downpipe 16. In this manner, the contaminants are exhausted out of the snorkel intake dirt inertial separator 12.

Figure 9:
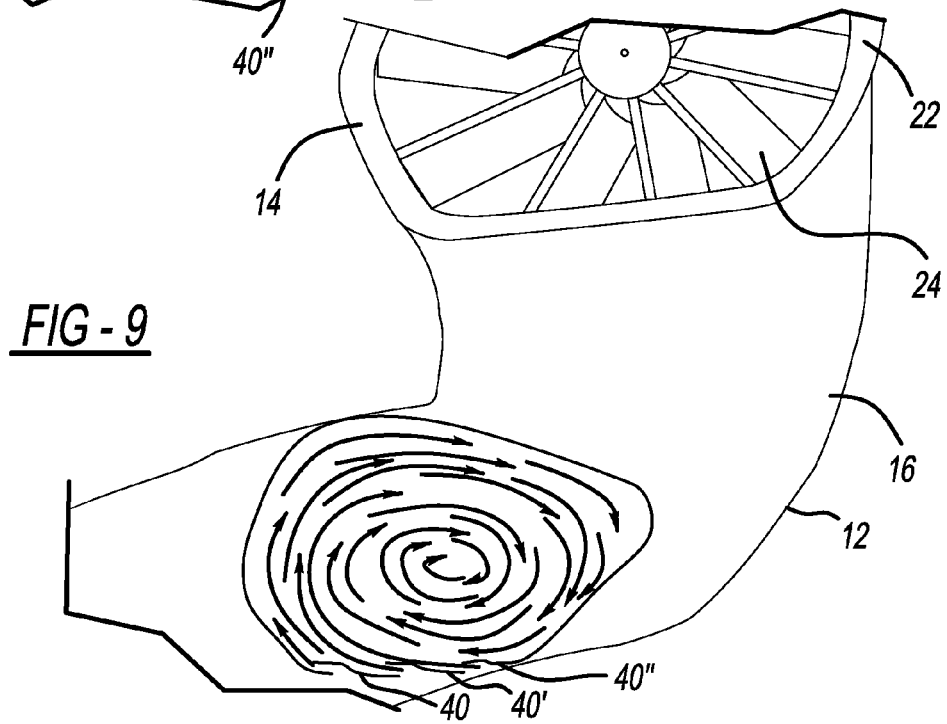
FIG. 9 is a partial view of the front of the snorkel intake dirt inertial separator showing a broken area that illustrates the air turbulence created therein.

The contaminants may also be expelled by the same cyclonic action through a series of extraction vents such as extraction vents 40, 40', 40" shown in FIGS. 8 and 9. The extraction vents are preferably formed at the rear lower portion of the snorkel downpipe 16 and thus also utilize the cyclonic flow motion and gravity to extract contaminants from intake flow.

The disclosed invention as set forth above overcomes the challenges faced by known stators used for removing contaminants from incoming air prior to the air reaching the air cleaner of the internal combustion engine. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A snorkel intake dirt inertial separator for use with the air intake of an internal combustion engine comprising:
   a downpipe having a long axis, an intake end, an outlet end and an air pathway defined between said intake end and said outlet end;
   an elongated extraction slot formed in said downpipe, said slot being parallel with said long axis;
   an array of angled vanes fitted in said air pathway, whereby a cyclonic motion is induced within said downpipe by said array of angled vanes.

2. The snorkel intake dirt inertial separator of claim 1 wherein said array of vanes is fitted to said inlet end of said downpipe.

3. The snorkel intake dirt inertial separator of claim 1 further including an end-cap, said array of vanes being integral with said end-cap.

4. The snorkel intake dirt inertial separator of claim 1 wherein said downpipe has a central region and wherein said array of angled vanes is fitted within said central region of said downpipe.

5. The snorkel intake dirt inertial separator of claim 1 further including a scraper associated with said extraction slot.

6. The snorkel intake dirt inertial separator of claim 1 further including an extraction vent plate associated with said extraction slot.

7. A snorkel intake dirt inertial separator for use with the air intake of an internal combustion engine comprising:
   a downpipe having an inside, an outside, an intake end, an outlet end and an air pathway defined between said intake end and said outlet end;
   an elongated extraction slot having a scraper formed in said downpipe, said scraper being bent inwardly from said outside to said inside;
   an array of angled vanes fitted in said air pathway, whereby a cyclonic motion is induced within said downpipe by said array of angled vanes.

8. The snorkel intake dirt inertial separator of claim 7 wherein said array of vanes is fitted to said inlet end of said downpipe.

9. The snorkel intake dirt inertial separator of claim 7 further including an end-cap, said array of vanes being integral with said end-cap.

10. The snorkel intake dirt inertial separator of claim 7 wherein said downpipe has a central region and wherein said array of angled vanes is fitted within said central region of said downpipe.

11. The snorkel intake dirt inertial separator of claim 7 further including an extraction vent plate associated with said at least one extraction slot.

12. A method for separating dirt from incoming air for delivery to an internal combustion engine comprising:
   forming a snorkel intake dirt inertial separator comprising a downpipe having an inside, an outside, a long axis, intake and outlet ends, an air pathway defined between said intake and outlet ends, an array of angled vanes fitted in said air pathway, and an elongated extraction slot parallel with said long axis formed between said inside and said outside;
   passing said air through said vanes of said downpipe; and
   separating dirt from air by cyclonic motion induced by said vanes.

13. The method for separating dirt from incoming air of claim 12 wherein said array of vanes is fitted to said inlet end of said downpipe.

14. The method for separating dirt from incoming air of claim 13 wherein said snorkel intake dirt inertial separator is fitted with an end-cap, said array of vanes being integral with said end-cap.

15. The method for separating dirt from incoming air of claim 12 wherein said downpipe has a central region and wherein said array of angled vanes is fitted within said central region of said downpipe.

16. The method for separating dirt from incoming air of claim 12 wherein said snorkel intake dirt inertial separator further includes an extraction vent plate associated with said at least one extraction slot.

* * * * *